United States Patent
Carrick et al.

(10) Patent No.: US 7,302,182 B2
(45) Date of Patent: *Nov. 27, 2007

(54) METHODS AND APPARATUS FOR SENSING MULTIPLE WAVELENGTHS SIMULTANEOUSLY IN A SINGLE WAVELENGTH SENSING DEVICE

(75) Inventors: John C. Carrick, Wakefield, MA (US); Eric B. SaintGeorges, Cupertino, CA (US); Chaoyu Yue, Dobbs Ferry, NY (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/472,634

(22) Filed: Jun. 22, 2006

(65) Prior Publication Data

US 2006/0239697 A1    Oct. 26, 2006

Related U.S. Application Data

(63) Continuation of application No. 10/185,429, filed on Jun. 28, 2002, now Pat. No. 7,113,705.

(60) Provisional application No. 60/302,327, filed on Jun. 29, 2001.

(51) Int. Cl.
*H04J 14/02* (2006.01)

(52) U.S. Cl. ............................ 398/95; 398/32; 398/91; 398/93

(58) Field of Classification Search .................. 398/91, 398/93, 95, 196
See application file for complete search history.

(56) References Cited

U.S. PATENT DOCUMENTS

| 4,977,563 A | 12/1990 | Nakatani et al. |
| 5,463,487 A | 10/1995 | Epworth |
| 7,133,610 B1 * | 11/2006 | Shimura et al. .............. 398/15 |

OTHER PUBLICATIONS

Park et al., A Multi-Wavelength Locker for WDM System, Optical Fiber Communication Conference, Technical Digest, Mar. 8, 2000.

* cited by examiner

*Primary Examiner*—Leslie Pascal
(74) *Attorney, Agent, or Firm*—Welsh & Katz, Ltd.

(57) ABSTRACT

A method and system provide for sensing multiple wavelengths simultaneously in a single wavelength sensing device. The system may have a plurality of laser signals and a plurality of identifiable modulation signals. A respective laser signal of the plurality of laser signals is combined with a respective identifiable modulation signal of the plurality of identifiable modulation signals so that each of the laser signals is identifiable. A combined optical signal is then formed from the modulated laser signals. A sensor has an input port that receives the combined optical signal. The sensor identifies, for each of the modulated laser signals, a respective laser signal via the identifiable modulation of the respective modulated laser signal.

21 Claims, 8 Drawing Sheets

METHODS AND APPARATUS FOR SENSING MULTIPLE WAVELENGTHS SIMULTANEOUSLY IN A SINGLE WAVELENGTH SENSING DEVICE

CROSS REFERENCE TO RELATED APPLICATIONS

This application is a Continuation of U.S. Ser. No. 10/185,429 filed Jun. 28, 2002 now U.S. Pat. No. 7,113,705 which claims the benefit of U.S. Provisional Application Ser. No. 60/302,327 filed Jun. 29, 2001.

FIELD OF THE INVENTION

The present invention relates generally to optical networks, and more specifically, to techniques for adjusting the path of optical signals.

BACKGROUND

Wavelength division multiplexing systems typically have multiple, separately modulated laser systems at a transmitter location. These laser systems are designed or actively tuned to operate at different wavelengths. When these laser emissions are combined in an optical fiber, the resulting wavelength division multiplexed optical signal has a corresponding number of separated channels. Along the transmission length, the channels may be collectively amplified by amplifier systems or gain fibers. At the receiving end, the channels are separated from each other to thereby enable detection by separate detectors.

The advantage of wavelength division multiplexing systems is that the transmission capacity of a single fiber can be increased. Modem wavelength division multiplexing systems have hundreds of spectrally separated channels per fiber. This yields increases in the data rate capacities of each fiber. Furthermore, the cost per bit of data in a wavelength division multiplexing system is typically less than in a comparative non-multiplexed system. This is because optical amplification systems required along the link are shared by all of the separate wavelength channels transmitted in the fiber. With non-multiplex systems, each channel/fiber would require its own amplification system.

However, there are difficulties associated with implementing a wavelength division multiplexing system. First, the transmitters and receivers are substantially more complex since, in addition to the laser emitters and receivers, optical components are required to combine the channels into, and separate the channels from, the wavelength division multiplexing optical signal. Furthermore, there is a danger of channel drift where the channels loose their spectral separation and overlap each other. This interferes with channel separation and demodulation at the receiving end.

Optical networks that have many wavelengths require wavelength control. Typically, wavelength control is performed at each laser source. At the laser source, a wavelength is sensed and then adjusted accordingly. In order to support this process, the system must provide either a plurality of wavelength sensing components or a switching network to present laser outputs sequentially to a single wavelength sensing component. Current wavelength sensing components sense only one wavelength at a time. The response of a first wavelength typically obscures the response of a second wavelength, which makes identifying the wavelength requiring adjustment and the direction of adjustment difficult. Thus there is a need for the ability to sense multiple wavelengths simultaneously in a single sensing device.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, in the several figures of which like reference numerals identify like elements, and in which:

DETAILED DESCRIPTION

Figure 1A:
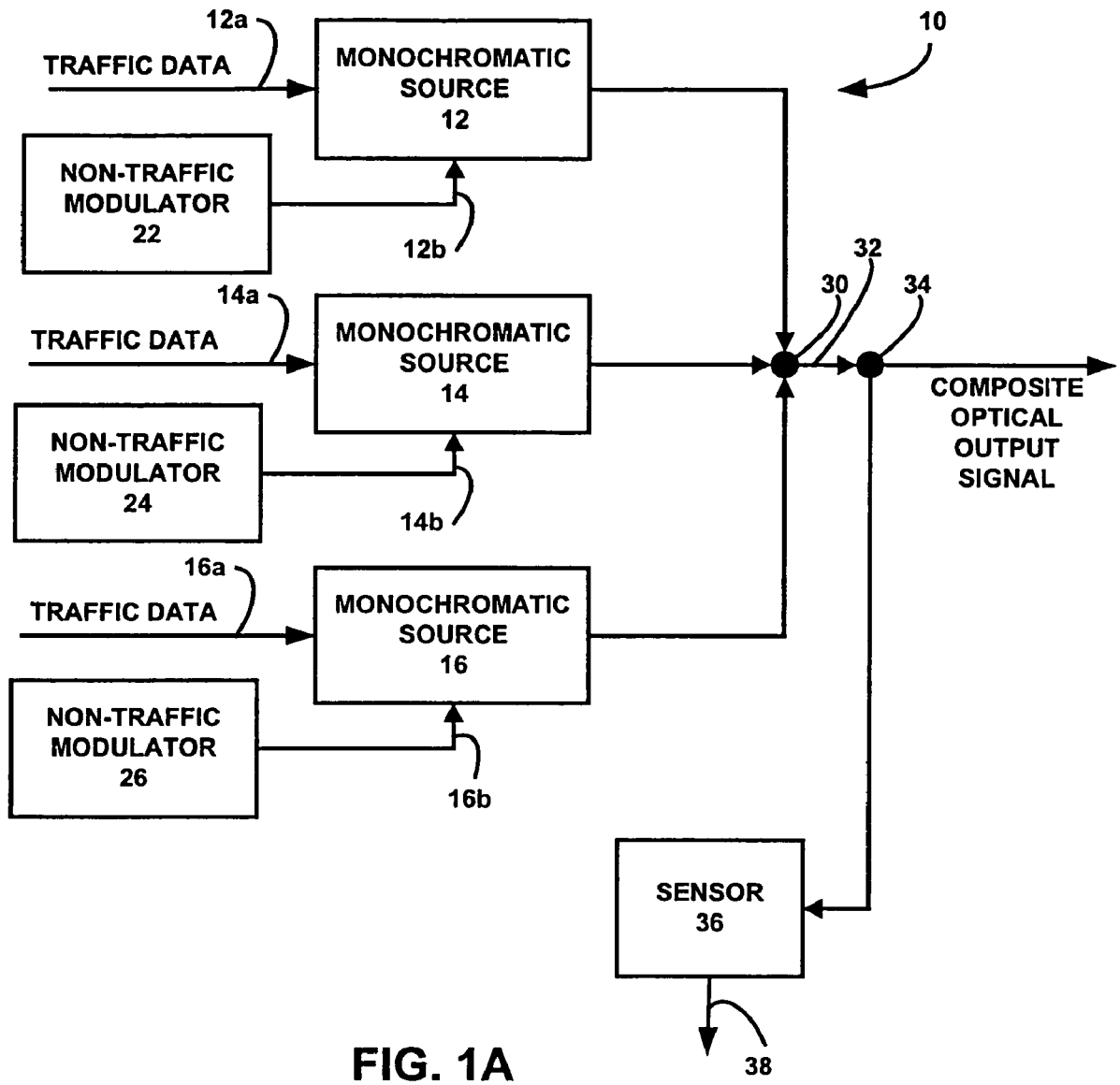
FIG. 1A is a block diagram of a circuit that identifies a monochromatic source associated with a non-traffic modulation thereof.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIGS. 1A-5B, discussed subsequently, illustrate various aspects of circuits and systems wherein members of a plurality of modulated monochromatic sources emitting radiant energy at respective wavelengths, can be identified using a single sensing device. FIG. 1A illustrates a block diagram 10 for identifying monochromatic sources of a type that could be used, for example, in optical wavelength division multiplexing communications systems. In this embodiment, members 12, 14, 16 of a plurality of substantially monochromatic sources, each have a traffic input port 12a, 14a, 16a for effecting traffic modulation of the respective source and a non-traffic modulation input port 12b, 14b, 16b for effecting a non-traffic control modulation.

The non-traffic modulation can be used to identify each of the sources 12, 14, 16 for control purposes. Exemplary types of modulation include amplitude modulation or pulse position modulation.

Ports 12b, 14b, 16b are respectively coupled to a plurality of non-traffic modulation sources 22, 24, 26. As discussed below, each of the non-traffic modulation sources 22, 24, 26 uniquely identify the output of each respective source without adversely interfering with the traffic modulation of the respective source. Modulated outputs of the monochromatic sources 12, 14, 16 are combined at a combiner or multiplexer 30 to create a composite optical output signal 32.

A portion of the signal 32 can be split off, via a coupler 34, and fed to a sensor 36. The sensing circuitry 36 can identify each of the plurality of monochromatic sources 12, 14, 16 by the respective non-traffic modulation from modulators 22-26. This process can be carried out using analog or digital components and processing.

A single sensor 36 can output one or more identity signals on line or lines 38. These signals can be fed back to respective control circuits to adjust the output frequencies of the respective sources 12-16.

In one embodiment the sensor 36 may incorporate a wavelength locker, such as a Fabry-Perot locker or an Etalon locker, that has an input for receiving the combined optical signal and that has first and second current outputs that emit first and second sets of alternating current responses, respectively. The respective first and second alternating current responses are associated with the respective identifiable modulation signal of the plurality of identifiable modulation signals. That is, each respective first and second alternating current response is associated with a respective modulated laser signal.

The sensor 36 also incorporates circuitry coupled to the first and second outputs which produces signals indicative of parameter values of the respective non-traffic modulation signals.

The sensor can incorporate a ratio module that forms a ratio of the first and parameter values. Representations of the ratios can be used for control purposes.

Figure 1B:
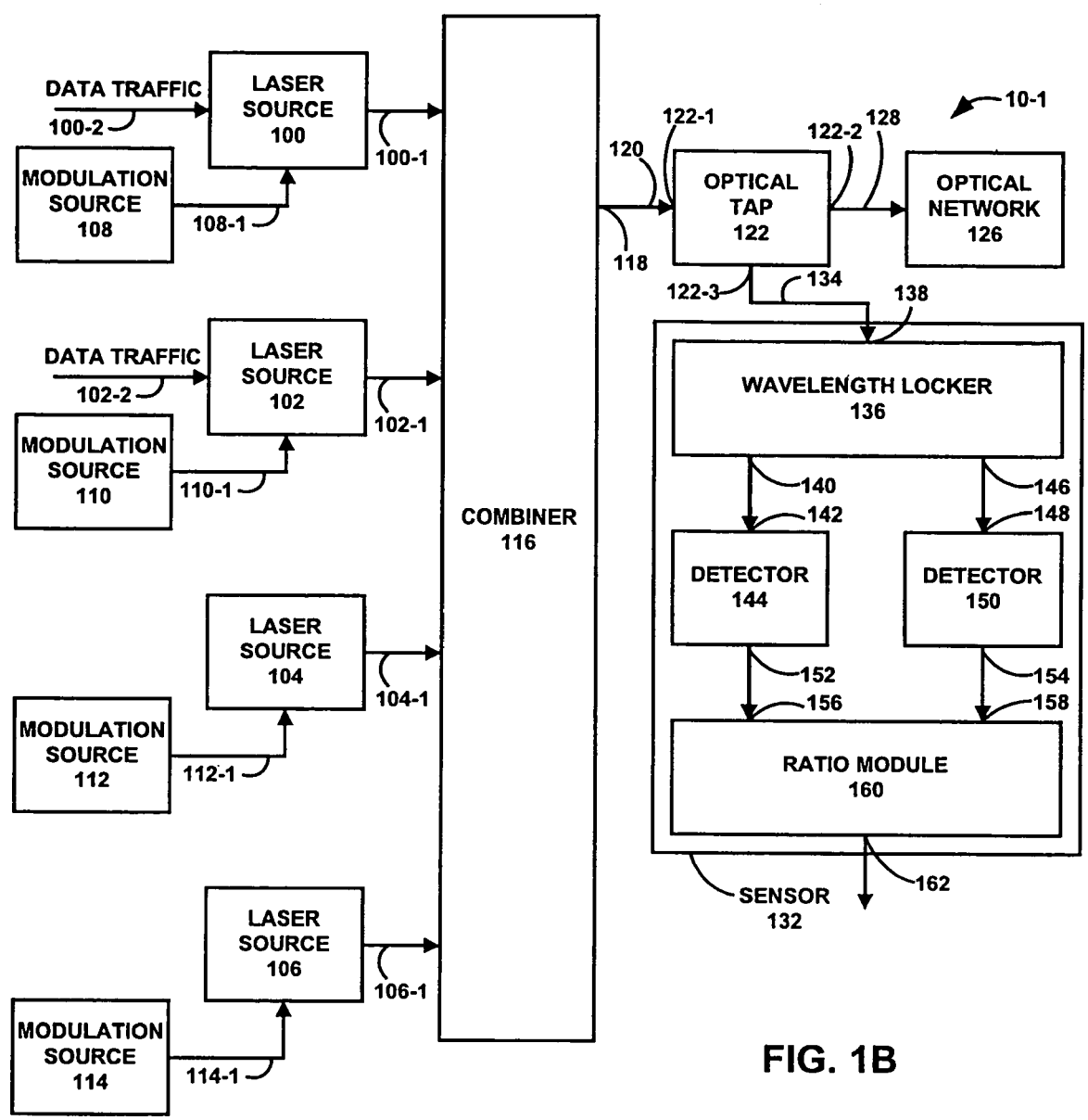
FIG. 1B is a block diagram of an example of a system in which an embodiment of a wavelength sensing device is utilized.

FIG. 1B illustrates an exemplary system 10-1 which has four laser or monochromatic sources, 100, 102, 104 and 106. It will be understood that neither the number, nor the type, nor the exact implementation details of the sources 100-106 are limitations of the present invention.

For exemplary purposes, sources 100, 102 are illustrated as being modulated with incoming data traffic signals 100-1, 102-1. Sources 104 and 106 do not receive traffic modulation signals and, if desired, could be used for calibration or control purposes.

Each of the sources 100-106 respectively receives an identifiable non-traffic modulation signal from a respective modulation source, such as sources 108, 110, 112, and 114. As noted above, non-traffic modulation could be implemented as amplitude modulation using sinusoidal modulating signals.

Optical output signals 100-1, 102-1 produced by the laser sources 100 and 102, are respectively modulated with the data traffic input signals 100-2, 102-2 and with the non-traffic modulation signals 108-1, 110-1 from the modulation sources 108, 110. Each of sources 104, 106 is modulated only by non-traffic modulation signals 112-1, 114-1 and emit optical output signals 104-1, 106-1.

In one embodiment the non-traffic modulation from sources 108-114 can take the form of a sinusoidal amplitude modulation with an index of approximately 0.04 and a frequency unique to each laser. The sinusoidal modulations may be referred to as the pilot tones, and the frequencies unique to the lasers may be referred to as pilot tone frequencies. Other methods and circuits may be used to identify the laser signals in the combined optical signal.

As an alternate to sinusoidal amplitude modulation, other forms of modulation, including pulse position modulation, could be used provided that the modulation response is proportional to the optical amplitude or power of the respective laser signal.

Each of the modulated signals from the sources 100, 102, 104 and 106 is combined in the combiner 116 to form a composite output signal. The combiner 116, may be implemented as an optical multiplexer, for example. The details of the combiner 116 are not a limitation of the invention. One or more multiplexers or combining elements can be used to produce the composite optical signal on an output 118 without departing from the spirit and scope of the invention.

The output optical signal can be coupled via an optical fiber 120 to an optical splitter or tap 122. The optical tap 122 has an input 122-1 and a first output 122-2, which is operatively connected to the rest of the optical network 126 by an optical fiber 128. A second output 122-3 of the optical tap 122 is coupled to a sensor 132 by another optical fiber 134.

The splitter or tap 122 provides a portion of the composite output from combiner 116 for use as a control signal to the sensor 132. The splitter 122 can be implemented in a variety of ways without departing from the spirit and scope of the invention.

In this embodiment the sensor 132 incorporates a Fabry-Perot wavelength locker 136, which has an input 138 connected to the optical fiber 134. The optical tap 122 is utilized to supply the combined optical signal to the Fabry-Perot locker 136 in the sensor 132. The optical tap 120 may be situated anywhere after the modulated laser signals have been combined.

As known to those of skill in the art, a plurality of wavelengths can be simultaneously present in locker 136. By processing locker outputs, signals can be obtained that correspond to various non-traffic modulation sources. These signals can be used to control the output wavelength of the respective laser source.

A first output 140 of the wavelength locker is a reference electrical output that is connected to the input 142 of a first detector 144. A second electrical output 146, the etalon output, of the wavelength locker 136 is connected to the input 148 of a second detector 150.

The utilization of non-traffic modulation signals, also referred to as pilot tones, allows the separation of Fabry-Perot locker or Etalon locker responses to individual wavelengths regardless of the number of wavelengths in the locker. As a result, laser sources may be adjusted onto correct wavelengths without having to limit the number of optical signals in the locker at any given time. Utilizing pilot tones with single wavelength sensing devices provides an efficient and cost effective solution to wavelength sensing.

Examples of commercially available Fabry-Perot wavelength lockers include the JDS E-Tek FPWL2110-14-100, and the JDS Uniphase WL5000 marketed by JDS Uniphase Corporation. These components have two current mode outputs, such as outputs 140, 146, having signals whose ratio varies as a function of wavelength. Known usage is to operate the locker with a single wavelength and form a ratio of the DC currents at the locker output.

The outputs 152 and 154 of the detectors 144 and 150 are respectively, connected to inputs 156 and 158 of a ratio module 160. The module 160 forms a ratio from the first and second alternating current responses that appear on the outputs 140 and 146, respectively, of the wavelength locker 136.

The ratio module 160 provides on an output 162 a control signal that is derived from the ratio. Alternatively, the ratio module 160 may directly output the ratio as a signal.

Pilot tone receivers, such as detectors 144 and 150 are utilized to perform alternating current detection. The detectors may be sufficiently narrow band such that they separate each pilot tone from all others, such that the response of each laser is kept separate. The detectors 144, 150 may also be required to reject most of the data traffic.

At the two outputs 140, 146 of the wavelength locker, prior to ratioing, the data traffic manifests itself as broadband noise with contributions from all lasers present. Each of the pilot tone receivers or detectors 144, 150 provides a narrow band pass filtering function that allows the rejection of data noise sufficient to reduce this noise from all the lasers to an acceptable level.

It will be understood that detectors 144, 150 and ratio module 160 could be implemented using analog circuitry and processing. Preferably, digital circuitry and processing would be used.

Figure 1C:
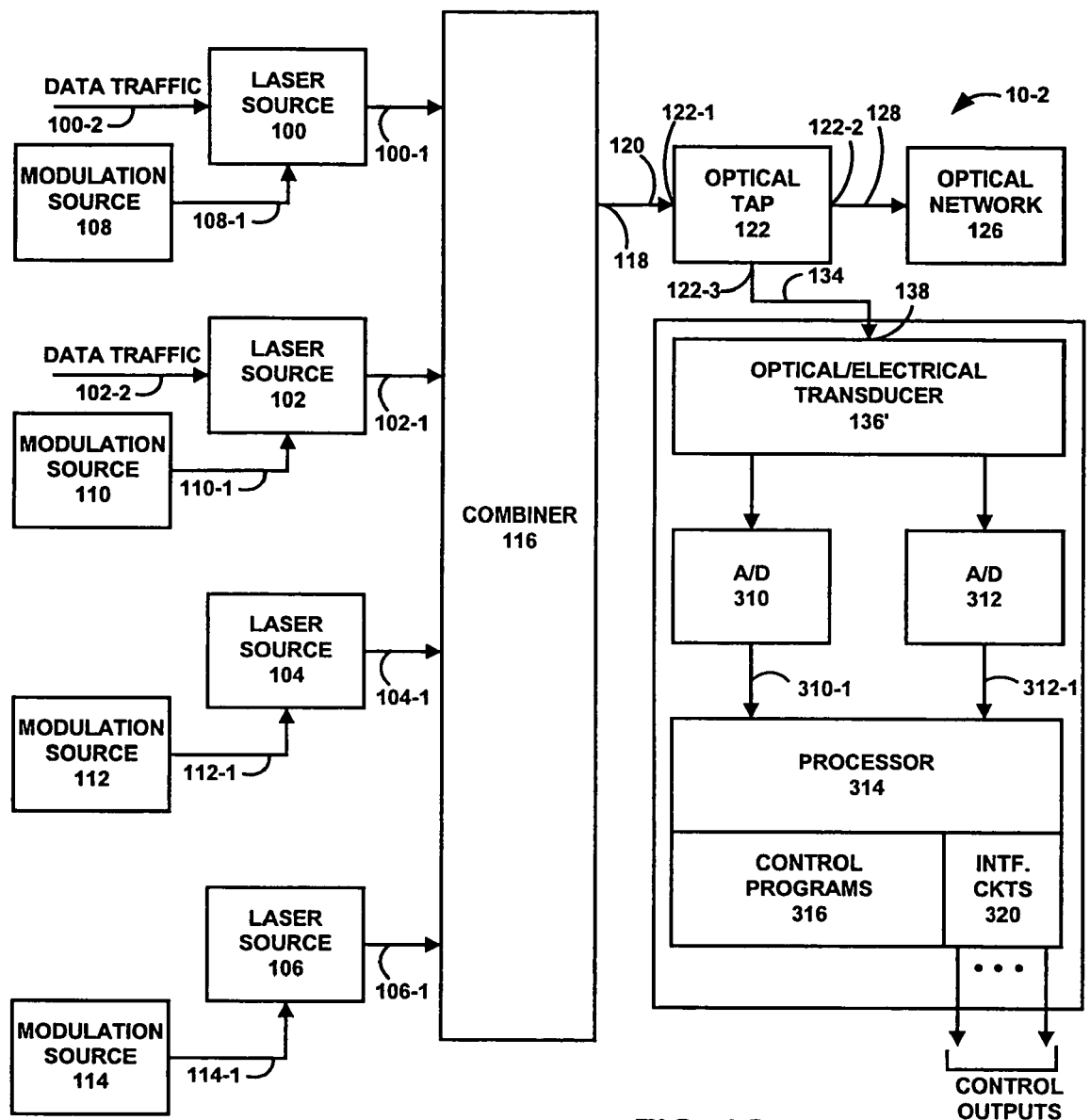
FIG. 1C is a block diagram of a system which incorporates another embodiment of a wavelength sensing device.

FIG. 1C illustrates as an alternate embodiment a system 10-2 which incorporates digital circuitry and processing to implement the processing to identify the non-traffic modulation signals in the composite optical signal. In the system 10-2, the same identification numerals are used to identify components discussed above in FIG. 1B.

Element 136' which receives the composite optical input signal could be implemented as wavelength locker 136 discussed above. Alternate types of optical/electrical transducers come within the spirit and scope of the present invention.

Alternates to the wavelength locker 136 include devices with an amplitude response which is a function of optical frequency such as thin film filters, Bragg grating filters and arrayed waveguide gratings. Optical output signals, from such devices, as would be understood by those of skill in the art, would be converted to electrical signals for further processing. For exemplary and best mode purposes, element 136' will be configured as a wavelength locker discussed above.

System 10-2 includes analog-to-digital converters 310, 312 coupled to outputs, such as outputs 140, 146, of locker 136'. The digitized data streams 310-1, 312-1 from converters 310, 312 are fed to a programmable processor 314. Processor 314 executes control programs 316 to process the data streams 310-1, 312-1.

In the system 10-2, filtering and detecting processes to isolate the non-traffic modulation sources, to detect and to provide parameters, for example, amplitudes of the respective sinusoidal modulation signals, would be embodied in programs 316 executed by digital processor 314.

The filtering process could be implemented in processor 314 via Fourier Transform processing embedded in control programs 316. The detected amplitudes of the non-traffic modulation signals preferably are proportional to the power or optical amplitude of the respective, modulated laser signal.

This processing will isolate the non-traffic modulation signals from the composite outputs 310-1, 312-1. It will also detect and provide representations of the amplitudes of non-traffic modulation signals where laser sources 100-106 has been amplitude modulated. Similarly, where the sources 100-106 have been pulse position modulated by the sources 108-114, the processing will provide representations of respective pulse positions.

Control programs 316 could use the amplitude or position information to generate a plurality of control output signals 318 via interface 320. Preferably, a ratio will be implemented by control programs 316 of the two signals derived from the reference and etalon outputs of locker 136'.

In a preferred embodiment, the wavelength sensing and control can be implemented using a Tellabs 7100™ optical networking product. This product includes optical channel multiplexing cards having multiple pilot tone receivers.

Pilot tone receivers from a channel multiplex card may be used as detectors on the locker outputs of the wavelength locker 136. The Fabry-Perot wavelength locker 136 and the pilot tone receivers, such as detectors 144 and 150, may be assembled on a single slot module.

Figure 2:
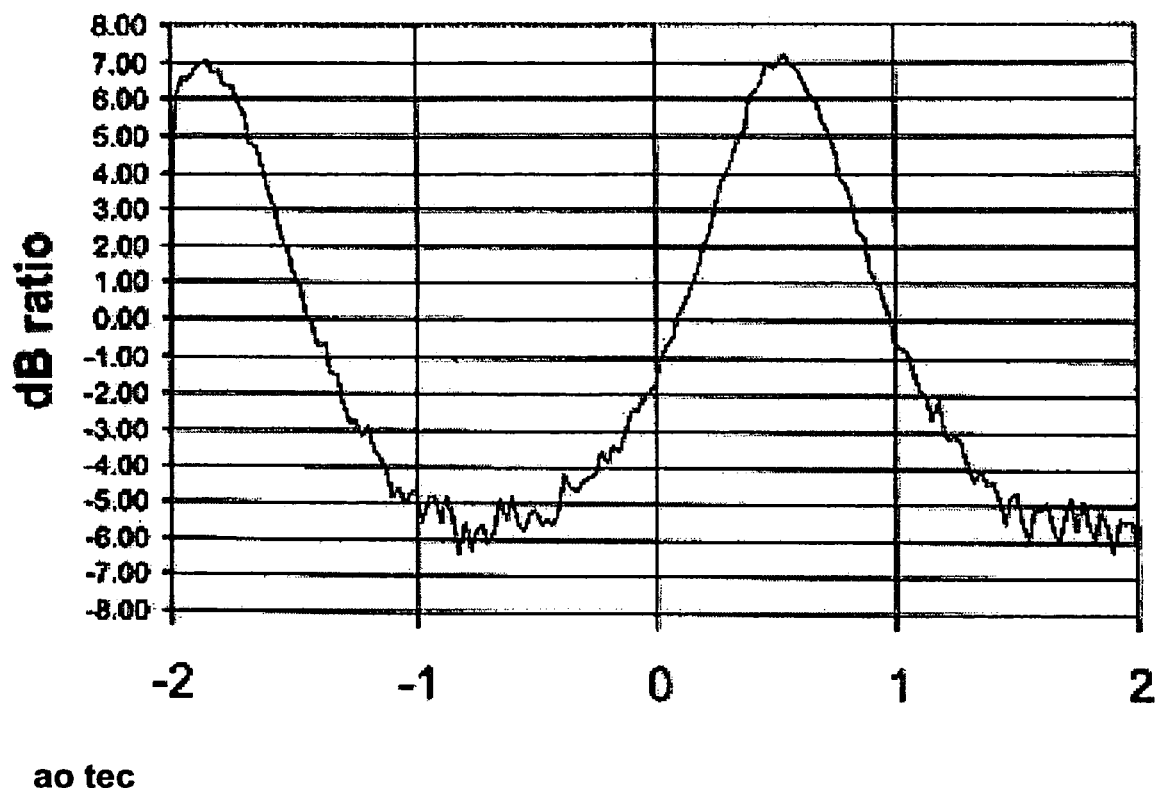
FIG. 2 is a graph depicting one example of a response for an embodiment of the wavelength sensing device.

FIG. 2 illustrates the Etalon to reference ratio as a function of the value "ao tec". "Ao tec" is proportional to wavelength and traverses about 1.2 nm, or about one and one half ITU (International Telecommunications Union) channels. Four optical signals are present, two with traffic and two with continuous wave tones, and all have pilot tones. Each pilot tone is at a different frequency. The trace represents the response of a signal to the etalon at −29 dBm with the wavelength varied across 1.2 nanometers. The excursion of the trace shows that the pilot tone electronics carries out wavelength determination on individual optical channels during the presence of other optical signals, with or without traffic data.

According to one embodiment, the pilot signal for each laser presented to the locker 136 is turned on and filtering is used to separate the responses at the two current outputs 140, 146. For a given pilot signal frequency, (with amplitude modulation) a ratio of the filtered and detected representations of the responses at the two current outputs can be formed in hardware or software. This is the ratio for the laser associated with the pilot signal, one of the outputs 318, and may be used to correct the wavelength of the respective laser. This may be achieved by adjusting the temperature of the laser being corrected.

The described detection, ratio formation, and wavelength control can be repeated for each pilot tone frequency and thus for each laser. This allows the lasers to be wavelength controlled with a single wavelength detecting component, or sensor, without requiring optical switching.

Other alternatives to wavelength locker 136 include, where the expected optical power at the splitter 122 is known, using a photodiode to generate an electrical representation of the composite optical signal. The output signal, which includes electrical representations of all the optical frequencies, could be digitized in an analog-to-digital converter.

The digitized data stream can be subject to filtering, Fourier Transform processing, to isolate the modulation sources, to detect and provide, for output purposes, a signal indicator of the amplitude of the modulation. This signal could be used without ratioing to adjust the wavelength of the respective laser source.

Another alternate would be to use a wavelength locker configured to provide a peak etalon output at the lock frequency. The signal can be processed and fed back to the laser's control circuits.

It will be understood that other sensor structures which do not require optical switching also come within the spirit and scope of the present invention. For example, the composite output optical signals, from the optical splitter or tap could be fed to a de-multiplexer.

The various de-multiplexed signals could be converted to electrical representations. The electrical representations could be demodulated, providing positive identification of the respective source. A common sensor, with associated filters can provide a frequency input signal to a control loop to adjust the respective source. Other variations are possible.

Figure 3:
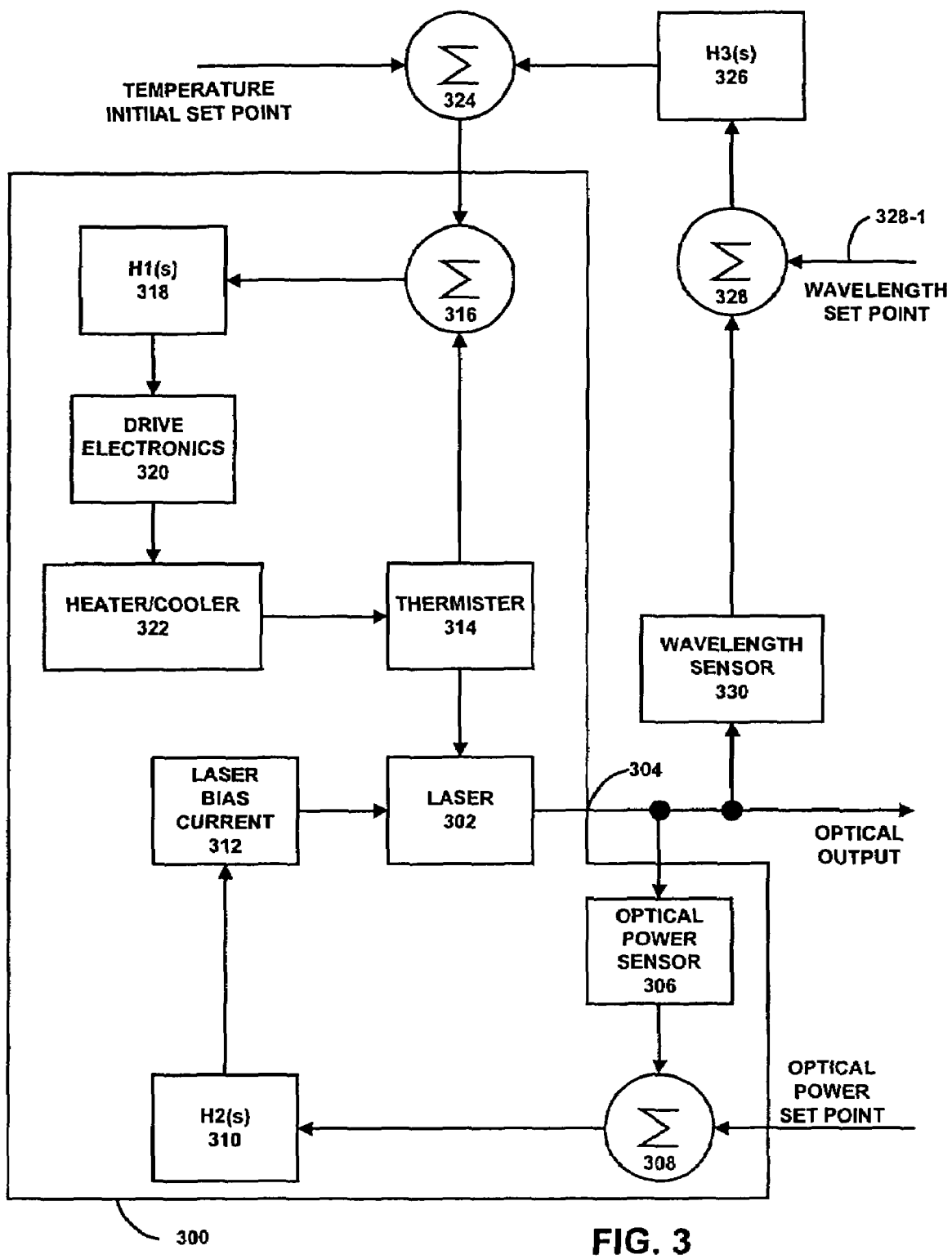
FIG. 3 is another block diagram of a system having a wavelength sensing device.

A communication path from the sensor 132 back to each respective laser controller may be implemented to allow for feed back control. FIG. 3 depicts an example of a multiple loop control system 300 for controlling a laser 302, such as each of the lasers 100-106. The laser 302 outputs a laser signal on an output 304. This laser signal on the output 304 is fed back through an optical power sensor 306 to a first summer 308.

The summer 308 also receives one other input signal, an optical power set point signal. The summer 308 forwards the summed signal to a first transfer function 310, which in turn sends a signal to a laser bias current module 312, which then inputs a control signal to the laser 302. This loop monitors and controls output power of laser 302.

The laser 302 also receives a signal on a control input from a thermister 314. The thermister 314 provides a feedback signal to a second summer 316. The summer 316 provides the summed signal to a second transfer function 318 that outputs a signal to drive electronics 320. A drive signal from electronics 320 is sent to a heater/cooler 322 which controls the thermister 314. This loop provides temperature control for adjusting the laser 302. The second summer 316 also receives an input from a third summer 324. Summer 324 receives inputs of an initial temperature set point signal and an output signal of a third transfer function module 326.

The third transfer function module 326 receives an input from a fourth summer 328. Summer 328 has as inputs a wavelength set point signal 328-1 (for example the output signal 162 from sensor 132 and a control signal from a wavelength sensor 330. The wavelength sensor inputs an optical output signal, such as each of the signals 100-1 . . . 106-1, which in this example is the laser signal from the laser 302. This loop controls output wavelength of the laser 302, or the exemplary outputs 100-1 . . . 106-1.

Those of skill will recognize that the above identified laser control system can be altered or simplified without departing from the spirit and scope of the invention. In one embodiment, the various control loops can be replaced with a programmed micro-processor(s) which implements one or more control processes in accordance with pre-stored instructions.

Figure 4:
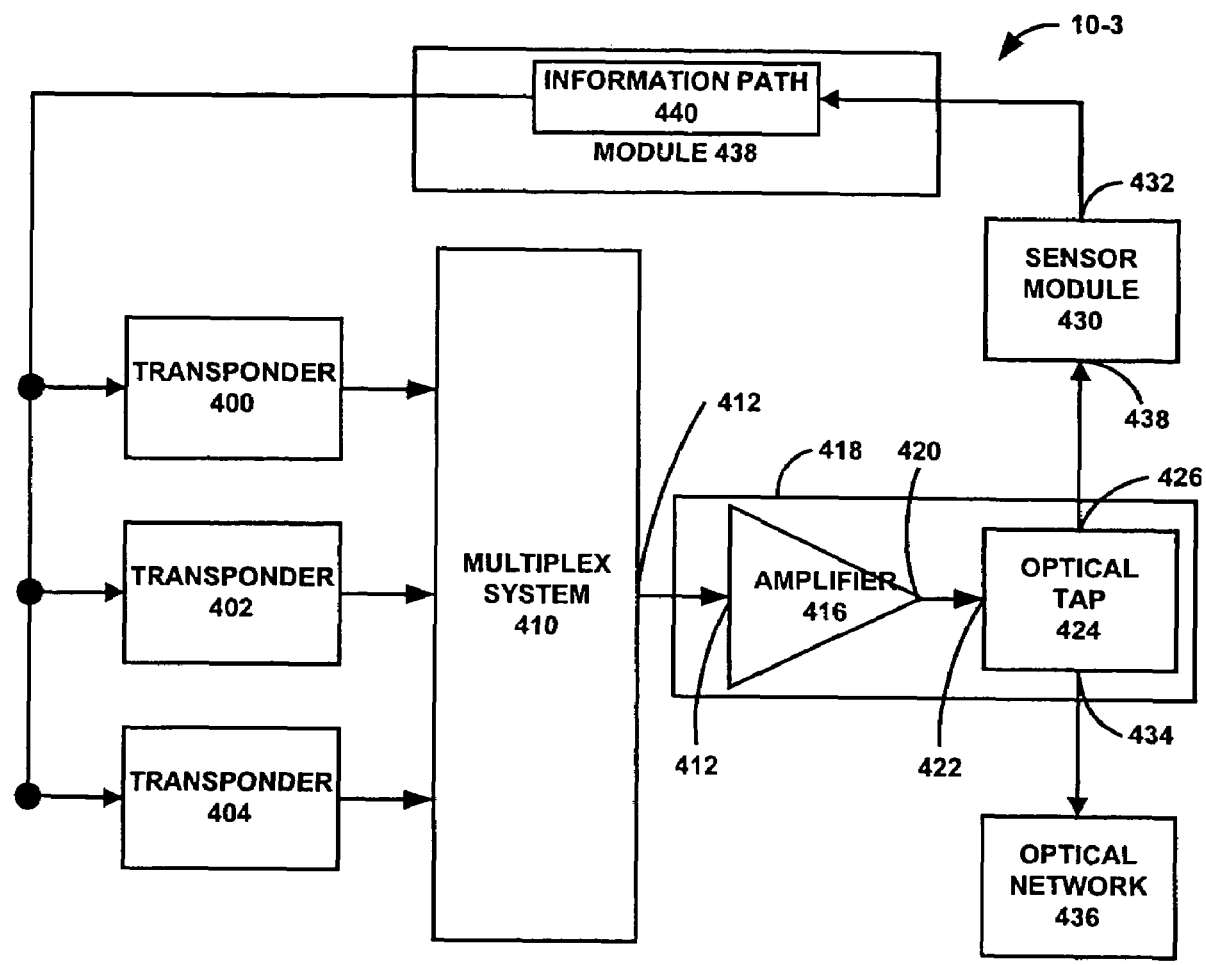
FIG. 4 is a block diagram of closed loop system incorporating an embodiment of the wavelength sensing device.

FIG. 4 depicts a closed loop system 10-3 which can be used to control optical signals in an optical network. The system 10-3 includes first, second and third transponders 400, 402 and 404, which include lasers as sources of optical output signals. These signals, each of which has a desired predetermined wavelength, can be modulated with respective unique pilot tones. They are operatively coupled to a multiplex system 410 (or multiplexer module). The system 410 produces a combined optical signal on an output of 412.

The composite optical output 412 of the multiplexer system 410 is operatively coupled to an input 412 of amplifier 416 in an amplifier module 418. An output 420 of the amplifier 416 is operatively connected to an input 422 of an optical splitter or tap 424. The amplified output 420 is in turn coupled to a feedback loop and a network 436.

The optical tap has a first output 426, which is connected to input 428 of an etalon sensor module 430, such as the module 132, which produces a control signal on output 432. The optical tap 424 also has an output 434, which is connected to the optical network 436.

The control signal, output 432, from the etalon sensor 430 is provided to a module 438 that has an information path 440. Information in the control signal is then used to correct the optical output signals of the transponders 400, 402 and 404. The module 438 supplies further control signals and information to each of the transponders 400, 402 and 404 to adjust the respective optical output signals.

It is also to be understood, of course, that the present invention in various embodiments can be implemented in hardware, software, or in combinations of hardware and software. For example, processor 314 can include a computer readable medium containing embedded program code for use in sensing multiple wavelengths simultaneously in a single wavelength sensing device. The computer readable media can contain at least first, second, and third program code segments.

The first program code segment detect, for each identifiable non-traffic modulation first and second modulation parameters such as first and second amplitudes or first and second positions. The respective first and second parameters are associated with a respective identifiable non-traffic modulation signal. The second program code segment can form a respective ratio from the first and second parameters for each of the lasers of the plurality of lasers. The third program code segment provides a respective ratio signal indicative of the respective ratio.

Figure 5A:
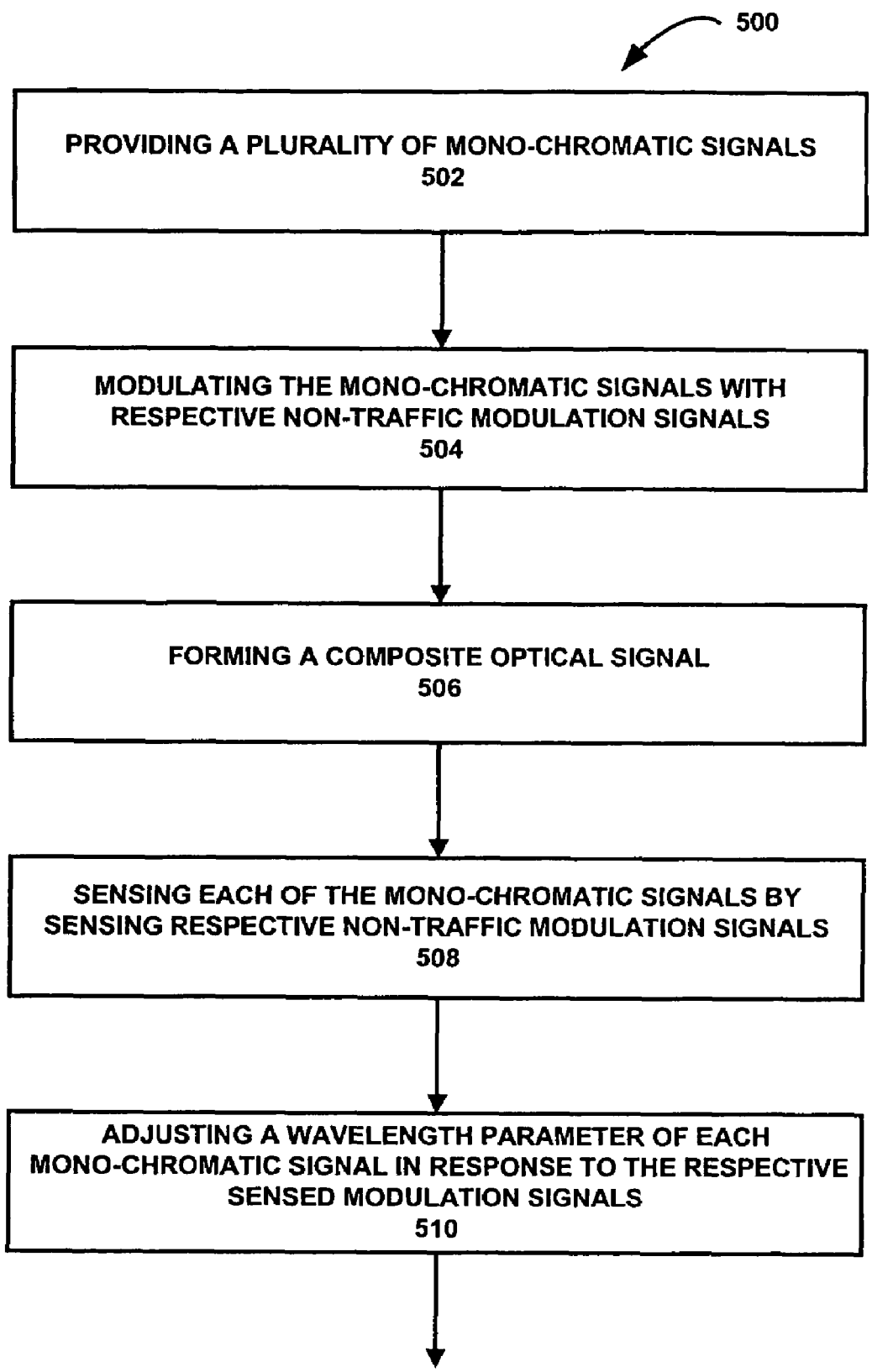
FIGS. 5A and B taken together illustrate a flow diagram of a method in accordance with the present invention.

FIG. 5A is a flow diagram of a method 500 which can be implemented, for example via system 10-1 of FIG. 1B or system 10-2 of FIG. 1C. In a step 502, a plurality of mono-chromatic optical signals is provided or generated. In a step 504, each of those signals is modulated with respective non-traffic modulation signals. In a step 506, the modulated signals are combined to form a composite optical signal.

In a step 508, the mono-chromatic signals in the composite optical signal are sensed by sensing respective non-traffic modulation signals. Step 508 can be implemented, as discussed above, using one or more programmed processors to digitally process the modulated signals to extract non-traffic modulation parameters for each of the respective signals. In a step 510, a wavelength parameter of each of the monochromatic signals can be adjusted in response to the respective modulation signal sensed in step 108.

The steps 508 and 510 can be repeated at predetermined time intervals, or continuously, to adjust the wavelengths of the respective mono-chromatic signals.

Figure 5B:
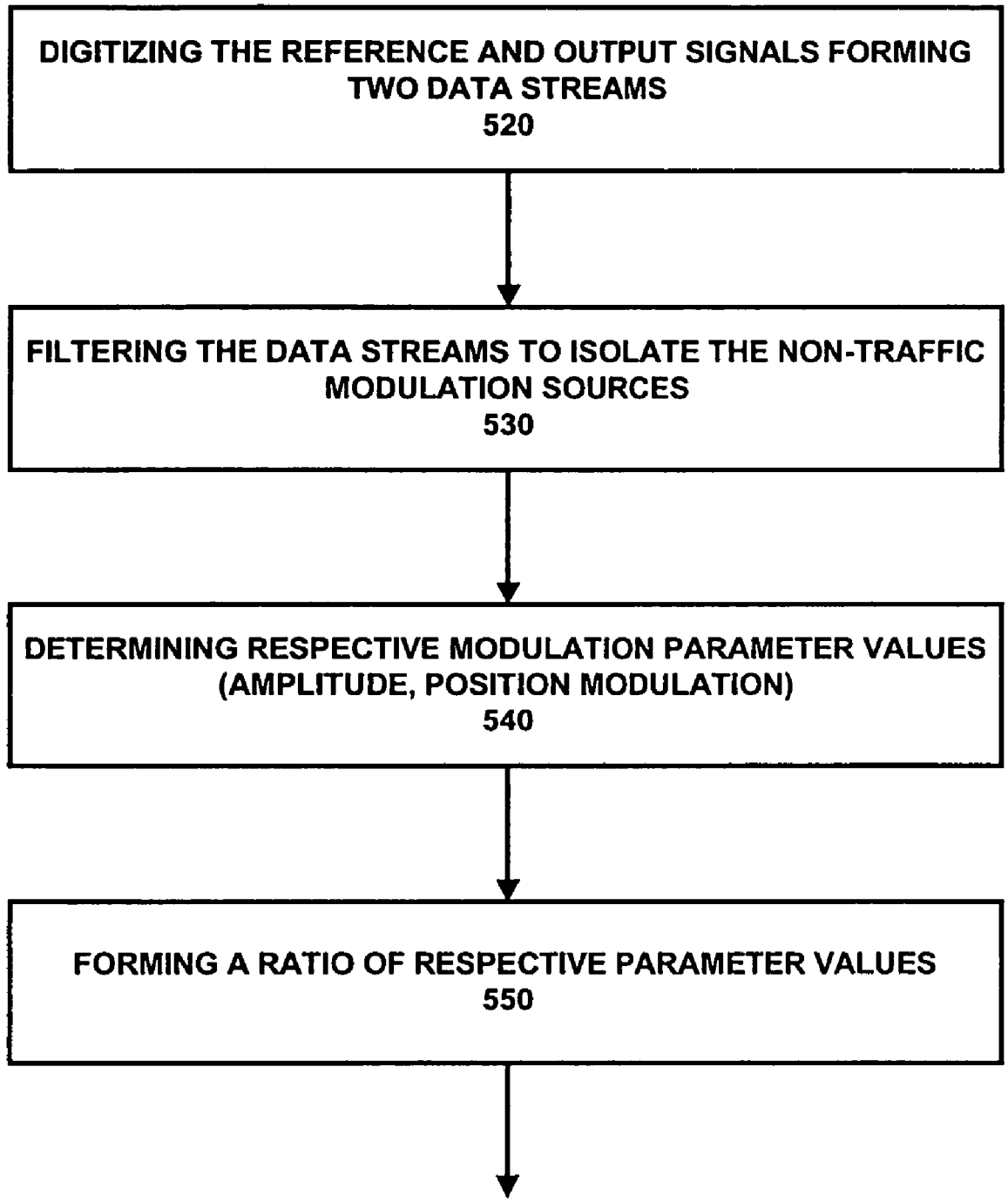

The block diagram of FIG. 5B provides additional details of the sensing step 508 of FIG. 5A with respect to the exemplary embodiments of FIGS. 1B or 1C. In an initial step 520, the reference and etalon output signals are digitized forming two data streams. In a step 530, the data streams are filtered to isolate and detect the non-traffic modulation source or sources associated with a respective laser source or sources. In a step 540, respective modulation parameter values, consistent with the type of non-traffic modulation, are determined. In a step 550, a ratio is formed of the respective non-traffic modulation parameter values. That ratio can then be used in step 510 to adjust a wavelength parameter of a respective monochromatic signal. It will be understood that the steps of FIGS. 5A and 5B can be implemented in hardware and software or both without departing from the spirit and scope of the present invention.

While various embodiments of the present invention have been described above, it should be understood that they have been presented by way of example only, and not limitation. As such, the breadth and scope of the present invention should not be limited to any of the above-described exemplary embodiments, but should be defined only in accordance with the following claims and their equivalents.

The invention claimed is:

1. A method for sensing multiple wavelengths comprising:
    providing a plurality of different substantially monochromatic optical signals, each signal having a respective wavelength;
    providing a plurality of identifiable modulation signals;
    modulating each member of the plurality of optical signals with a respective identifiable modulation signal from the plurality of identifiable modulation signals and forming a combined optical signal;

forming for each of the optical signals, respective first and second representations which are associated with a respective identifiable modulation signal of the plurality of identifiable modulation signals; and forming a respective ratio from the first and second representations.

2. A method as in claim 1 including using the ratio to adjust the wavelength of a respective optical signal.

3. A method as in claim 2 which includes forming a plurality of ratios to adjust the wavelength of each of the optical signals.

4. A method as in claim 3 which includes providing at least one of circuitry, or software which forms the ratios.

5. A method of controlling a plurality of optical sources, comprising:

providing a plurality of optical sources, each of the sources emits an optical signal having a respective wavelength;

providing a plurality of identifiable modulation signals;

modulating a respective optical signal of the plurality of signals with a respective identifiable modulation signal of the plurality of identifiable modulation signals and forming a combined optical signal; and forming a respective control signal, for each of the optical signals in the plurality by forming first and second electrical representations of each member of the plurality of identifiable modulation signals at a common element.

6. A method as in claim 5 where forming includes filtering first and second representations to isolate identifiable modulation signals.

7. A method as in claim 5 which includes activating each member of the plurality of identifiable modulation signals and filtering the first and second electrical representations.

8. A method as in claim 6 where the control signals each adjust a temperature parameter of a respective optical source.

9. A method as in claim 6 which includes digitizing the first and second representations prior to filtering them.

10. An optical communications system comprising:

a plurality of lasers, each of the lasers has at least a non-traffic modulation input and a wavelength adjusting input, each member of the plurality emits an optical output;

a plurality of non-traffic modulation sources, each member of the plurality of sources is coupled to a non-traffic modulation input of a respective laser;

a combiner coupled to the optical outputs, the combiner forming a composite optical output;

a wavelength locker coupled to the composite optical output, the locker emitting first and second output signals;

at least first and second non-modulation source detectors associated with a selected modulation source and coupled to the first and second output signals; and control circuitry, responsive to outputs from the detectors, that couples a control signal to a wavelength adjusting input of a laser associated with the selected modulation source.

11. A system as in claim 10 which includes a plurality of pairs of non-traffic modulation source detectors, each pair is associated with a respective non-traffic modulation source.

12. A system as in claim 11 where the control circuitry responds to respective pairs and couples a respective control signal to a wavelength adjusting input of a respective laser.

13. A system as in claim 10 where the non-modulation source detectors comprise a programmed processor.

14. A system as in claim 13 which includes at least first and second analogue-to-digital converters.

15. A system as in claim 14 which includes filtering software, executed by the processor.

16. A method comprising:

generating a plurality of modulatable, substantially monochromatic beams of radiant energy with each member of the plurality having a predetermined wavelength;

modulating each member of the plurality with respective identification signal;

forming a composite optical beam;

converting the beam into a plurality of electrical signals with respective pairs of electrical signals associated with a respective identification signal;

using respective pairs of electrical signals to adjust the wavelength of a respective member of the plurality of modulatable beams.

17. A method as in claim 16 where converting includes providing a wavelength locker to produce the plurality of pairs of electrical signals.

18. A method as in claim 17 which includes coupling first and second outputs from the wavelength locker to a plurality of pairs of filters where pairs of the filters are associated with respective identification signals.

19. A method as in claim 17 which includes forming a plurality of ratios of pairs of electrical signals.

20. A method as in claim 17 including using each pair of signals to adjust the wavelength of a respective modulatable beam.

21. A method as in claim 16 where converting includes digitizing and filtering the signals to form a plurality of wavelength control signals which are associated with respective modulatable beams of radiant energy.

* * * * *

UNITED STATES PATENT AND TRADEMARK OFFICE
CERTIFICATE OF CORRECTION

PATENT NO. : 7,302,182 B2 Page 1 of 1
APPLICATION NO. : 11/472634
DATED : November 27, 2007
INVENTOR(S) : John C. Carrick, Eric B. SaintGeorges and Chaoyu Yue It is certified that error appears in the above-identified patent and that said Letters Patent is hereby corrected as shown below:

Column 2, Line 52: Add a space between comma and "16b"
Column 7, Line 22: Add a closed parenthesis after "330" and before the period Signed and Sealed this Twenty-third Day of September, 2008

JON W. DUDAS
*Director of the United States Patent and Trademark Office*